(12) United States Patent
Desmarais et al.

(10) Patent No.: US 7,232,154 B2
(45) Date of Patent: Jun. 19, 2007

(54) HEIGHT ADJUSTER WITH SPRING HAVING DUAL FUNCTIONS

(75) Inventors: Robert J. Desmarais, Lake Orion, MI (US); Kim Anzell, Sterling Heights, MI (US); Phillip Yee, Troy, MI (US); Joel Gordon, Detroit, MI (US); Gopalakrishnan Doraiswamy, Sterling Heights, MI (US); Richard Koning, Yale, MI (US); Ravinder Mann, Sterling Heights, MI (US); David R. Arnold, Macomb, MI (US); Lawrence M. Refior, Romeo, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 92 days.

(21) Appl. No.: 11/138,002

(22) Filed: May 27, 2005

(65) Prior Publication Data

US 2006/0113786 A1 Jun. 1, 2006

Related U.S. Application Data

(60) Provisional application No. 60/632,251, filed on Dec. 1, 2004.

(51) Int. Cl.
*B60R 22/20* (2006.01)
(52) U.S. Cl. .................... 280/801.2; 280/804
(58) Field of Classification Search .......... 280/801.2, 280/804, 801.1, 808; 297/483
See application file for complete search history.

(56) References Cited

U.S. PATENT DOCUMENTS

| 4,436,323 | A | * | 3/1984 | Yamamoto | 280/804 |
|---|---|---|---|---|---|
| 4,453,741 | A | * | 6/1984 | Hipp et al. | 280/801.2 |
| 5,860,675 | A | * | 1/1999 | Muller et al. | 280/801.2 |
| 6,186,548 | B1 | * | 2/2001 | McFalls | 280/801.2 |
| 6,733,041 | B2 | | 5/2004 | Arnold et al. | |
| 2005/0242563 | A1 | * | 11/2005 | Daume et al. | 280/801.2 |
| 2005/0253366 | A1 | * | 11/2005 | Uno et al. | 280/730.2 |

* cited by examiner

*Primary Examiner*—Paul N. Dickson
*Assistant Examiner*—Drew J. Brown
(74) *Attorney, Agent, or Firm*—Lonnie Drayer

(57) ABSTRACT

A height adjuster for a vehicle safety restraint has a web guide (38) and a track (84) for the web guide. The web guide (38) is vertically moveable along the track (84). A lock (76) has a lock condition for preventing vertical movement of the web guide (38) along the track (84) and an unlocked condition for allowing vertical movement of the web guide (38) along the track (84). A release mechanism (50, 80) is operatively connectable to said lock (76). The release mechanism (50, 80) has a release position for placing the lock (76) in the unlocked condition and an unreleased position from maintaining the lock (76) in the lock condition. A lift mechanism (66) at least partially assists vertical movement of the web guide (38) along the track (84) and biases the release mechanism (50, 80) toward the unreleased position.

18 Claims, 6 Drawing Sheets

HEIGHT ADJUSTER WITH SPRING HAVING DUAL FUNCTIONS

This non-provisional patent application claims priority to U.S. Provisional Patent Application 60/632,251 filed on Dec. 1, 2004.

BACKGROUND OF THE INVENTION

This invention relates to a height adjuster for a safety belt system.

Typically, a safety belt for a vehicle has a lap belt and a shoulder belt. The safety belt is anchored to a vehicle at three different locations around a passenger. Two anchors secure the lap belt while a third anchor, a loop, web guide or D-ring, provides a sliding support for the shoulder belt and is secured to the B-pillar of the vehicle. The web guide or D-ring (or loop) is preferably located just above the shoulder height of the passenger. Due to varying sizes of passengers, manufacturers use a device known as an adjustable turning loop assembly, or height adjuster, to adjust the height of the web guide up or down to permit for the accommodation of these differing sizes.

The adjustable turning web guide assembly is mounted to a B-pillar of the vehicle. When the assembly is unlocked, say at the touch of a button, the web guide is movable vertically to its desired position. Most of this assembly is covered by a trim panel. The button that unlocks the assembly may be part of the trim panel. Pressing this button to an actuated position such as downward or inward, unlocks a locking mechanism of the height adjuster and permits movement of the web guide from one vertical position to another.

Due to its location, the height adjuster supports the weight of the shoulder belt. In addition to this load, many safety belt systems have a seat belt retractor that tensions the safety belt to take up slack. Consequently, a passenger wishing to move the position of the web guide upward must overcome the downward force of the seat belt retractor and the weight of the seat belt. It would be desirable to facilitate the lifting of the height adjuster.

In addition, the button controlling unlocking of the lock mechanism has a spring to bias the button to a rest position, for example, a force (spring) in an upward direction, so that the button returns to its rest position following actuation. The spring is a separate component. It would be desirable to combine this button spring with other components of the height adjuster assembly.

A need therefore exists for a device that both assists a passenger in the lifting of the height adjuster assembly and returns the button of the assembly to its original position without increasing the number of components.

SUMMARY OF THE INVENTION

A height adjuster for a vehicle restraint has a web guide for receiving a seat belt. The web guide is vertically moveable along a track. A lock prevents vertical movement of the web guide along the track when in a locked condition and allows vertical movement of the web guide along the track when in an unlocked condition. A release mechanism is connected to the lock. The release mechanism has a release position for placing the lock in an unlocked condition and an unreleased position for maintaining the lock in a lock condition. Furthermore, a lift mechanism at least partially assists vertical movement of the web guide along the track and biases the release mechanism toward the unreleased position. In this way, a single lift mechanism, such as a spring, acts to both assist the passenger in raising the web guide and biasing the button that releases the web guide in an unreleased position.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
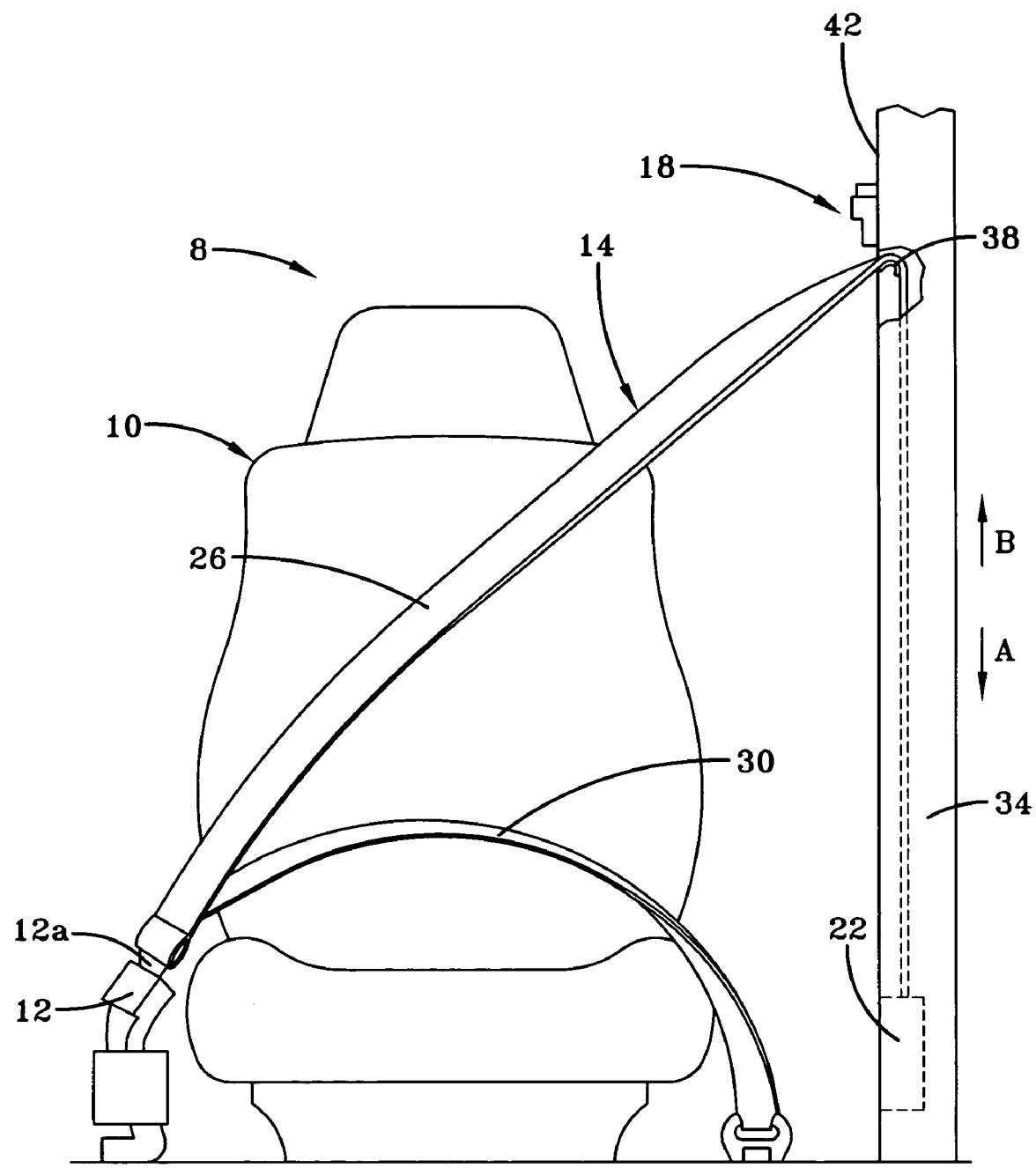
FIG. 1 illustrates a safety restraint system incorporating the inventive height adjuster.

FIG. 1 illustrates a safety restraint system 8 for a vehicle. As shown, seat belt 14 is disposed over seat 10. Seat belt 14 comprises shoulder belt portion 26, lap belt portion 30 and seat belt buckle 12 and a tongue 12a insertable into a locking engagement with the buckle 12. Seat belt retractor 22 is also provided to take up any slack of shoulder belt portion 26 over a passenger. As shown, shoulder belt portion 26 passes from seat belt retractor 22 through a loop 38, here a D-ring which is also referred to in the art as a web guide.

Web guide, (formed as a loop) 38 is a part of a height adjuster assembly 18, which allows web guide 38 to be moved downward in the direction of arrow A or upward in the direction of arrow B. In this way, web guide 38 may be adjusted in height to accommodate differently sized vehicle occupants. Height adjuster assembly 18, along with web guide 38, are mounted to B-pillar 34 of the vehicle (see FIG. 4 for example). B-pillar trim panel 42 is provided over height adjuster assembly 18 to hide most of its working components. These features of the invention are well known.

Figure 2:
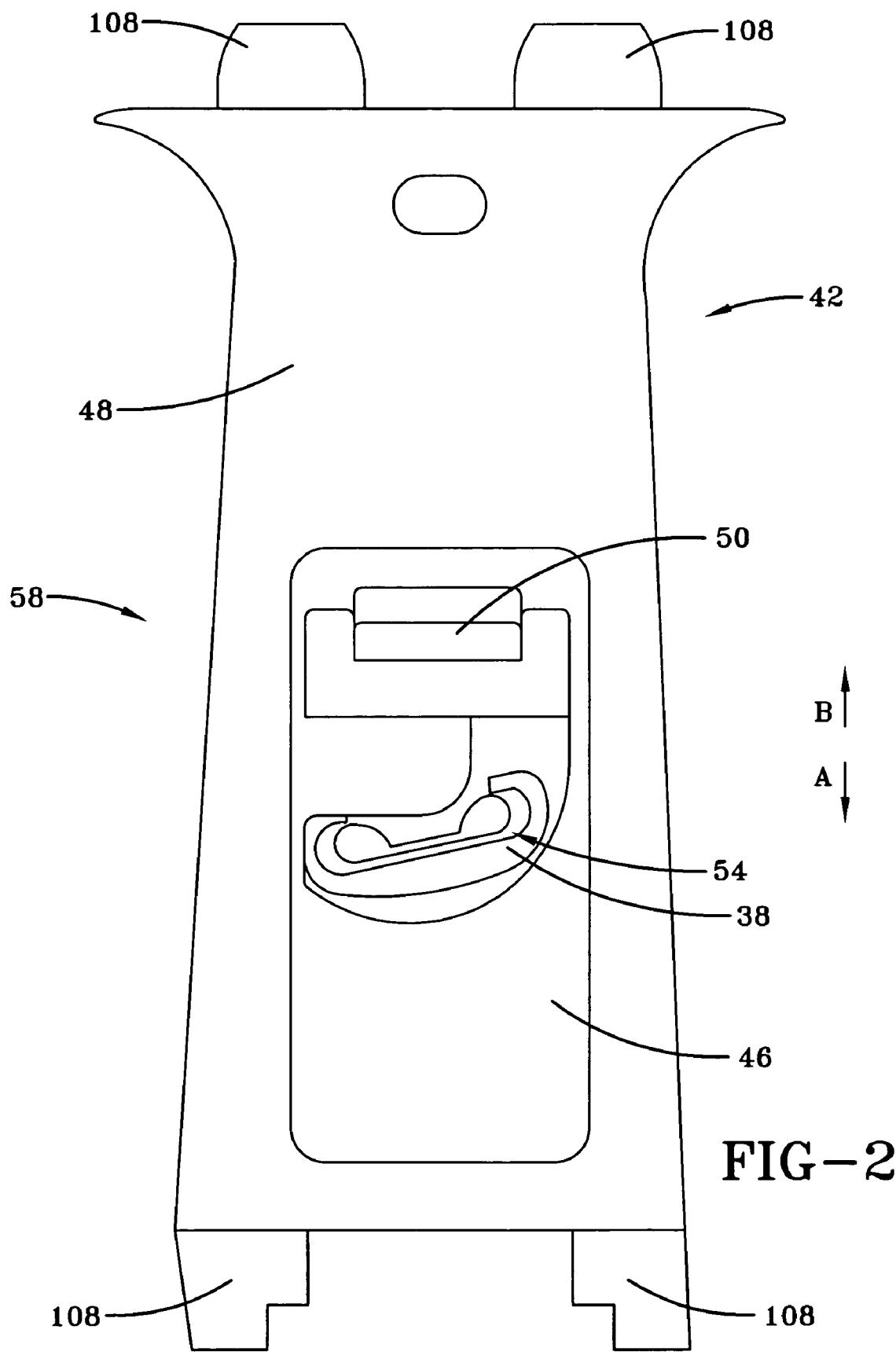
FIG. 2 illustrates a view of the height adjuster of FIG. 1, including web guide.
Figure 3:
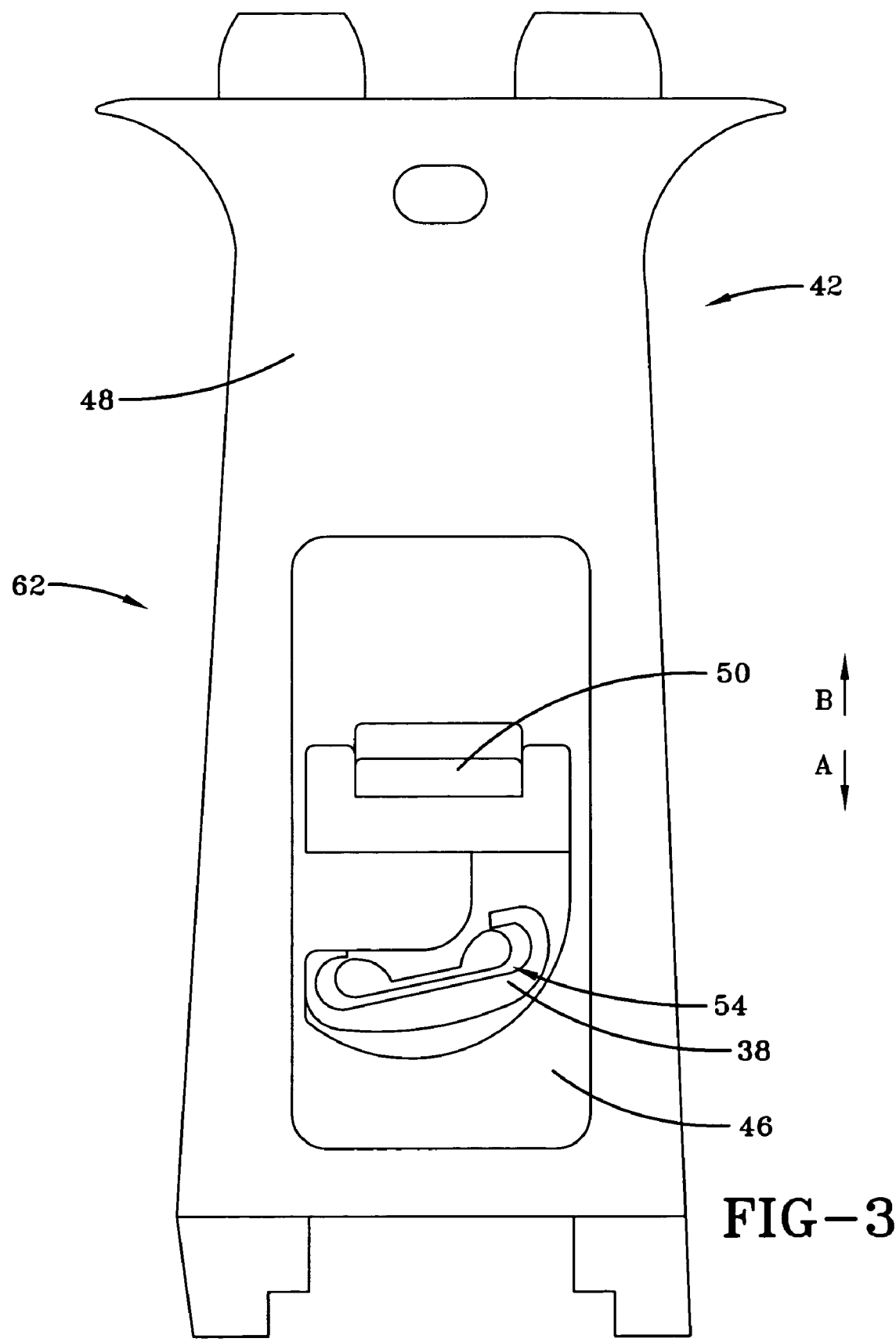
FIG. 3 illustrates the height adjuster of FIG. 2 after adjustment of the location of the web guide.

FIG. 2 shows a view of B-pillar trim panel 42 of FIG. 1. B-pillar trim panel 42 comprises fixed base 48, sliding cover 46, and release actuator cover 50. Fixed base 48 has trim panel mounting tabs 108 that interlock B-pillar trim panel 42 to other trim panels, which are fixed to B-pillar 34. Alternatively, the B-pillar trim can be secured directly to the B-pillar. However, sliding cover 46 and release actuator cover 50, here a button, are free to move relative to fixed base 48 with movement of web guide 38 in the direction of arrow A or arrow B. Furthermore, sliding cover 46 is provided with cover opening 54 through which passes seat belt 14 to web guide 38.

Figure 5:
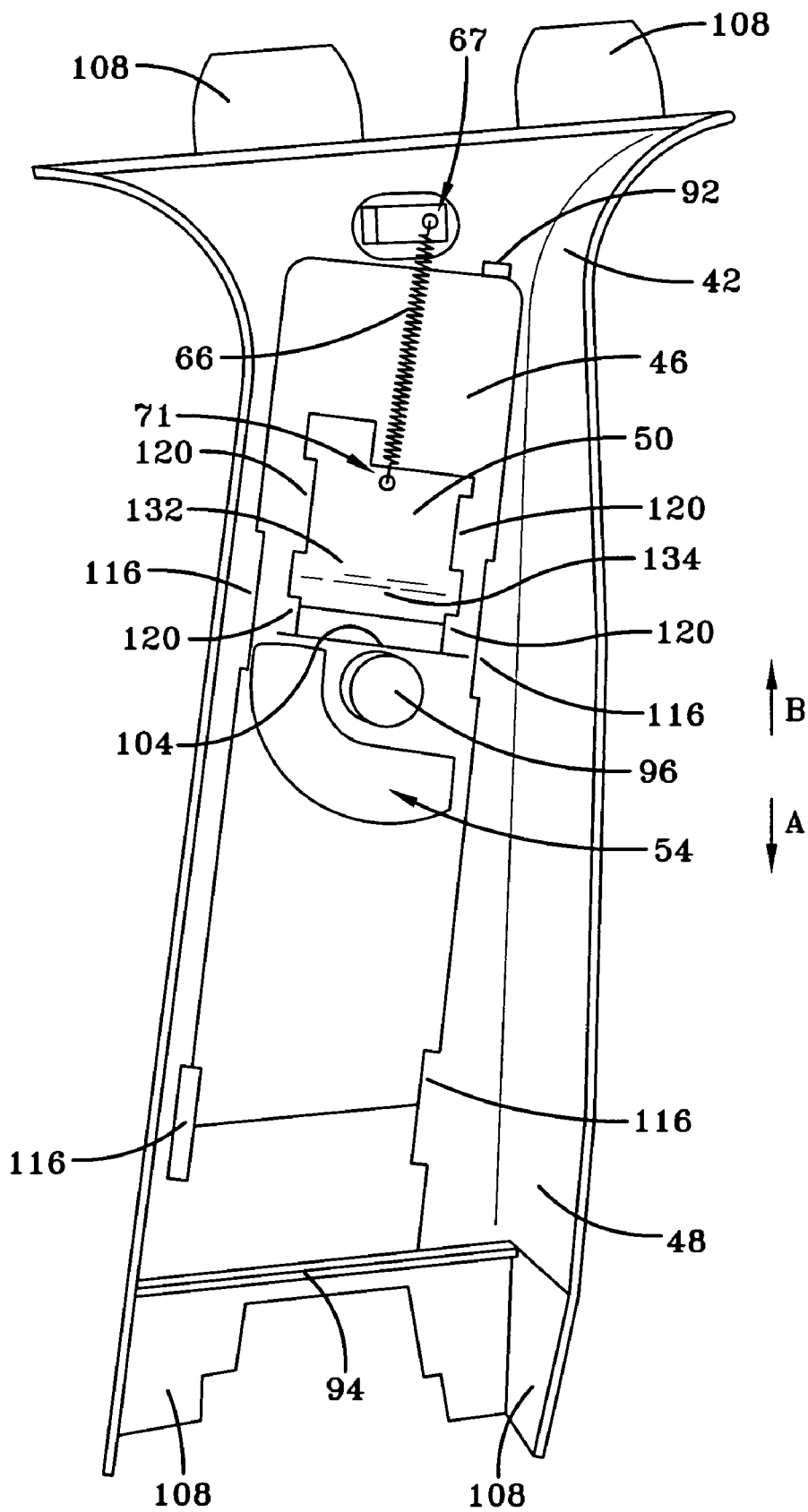
FIG. 5 illustrates a behind view of the height adjuster of FIG. 2.

FIG. 5 illustrates a back view of B-pillar trim panel 42. As shown, B-pillar trim panel 42 has sliding cover retaining tabs 116, which hold sliding cover 46 to fixed base 48 while permitting sliding movement of sliding cover 46 in the direction of arrow A or in the direction of arrow B. In addition, sliding cover stop 92 is provided to prevent further upward travel of sliding cover 46 in the direction of arrow B. Sliding cover 46 in the position shown, however, is free to move in the direction of arrow A, downward, to sliding cover stop 94. Thus, sliding cover 46 may slide freely between sliding cover stop 92 and sliding cover stop 94.

Sliding cover 46 also slideably receives release actuator cover 50, a button. Here, release actuator cover 50 is retained by release actuator cover retaining tabs 120 that hold release actuator cover 50 to sliding cover 42 while still permitting movement of release actuator cover 50 in the direction of arrow A or in the direction of arrow B. In its highest position, release actuator cover 50 abuts ledge 132 (see FIG. 4) of sliding cover 46. Release actuator cover stop 104 is provided to prevent release actuator cover 50 from traveling further in the direction of arrow A. Accordingly, release actuator cover 50 may slide freely between release actuator cover stop 104 and ledge 132 of sliding cover 46.

Figure 4:
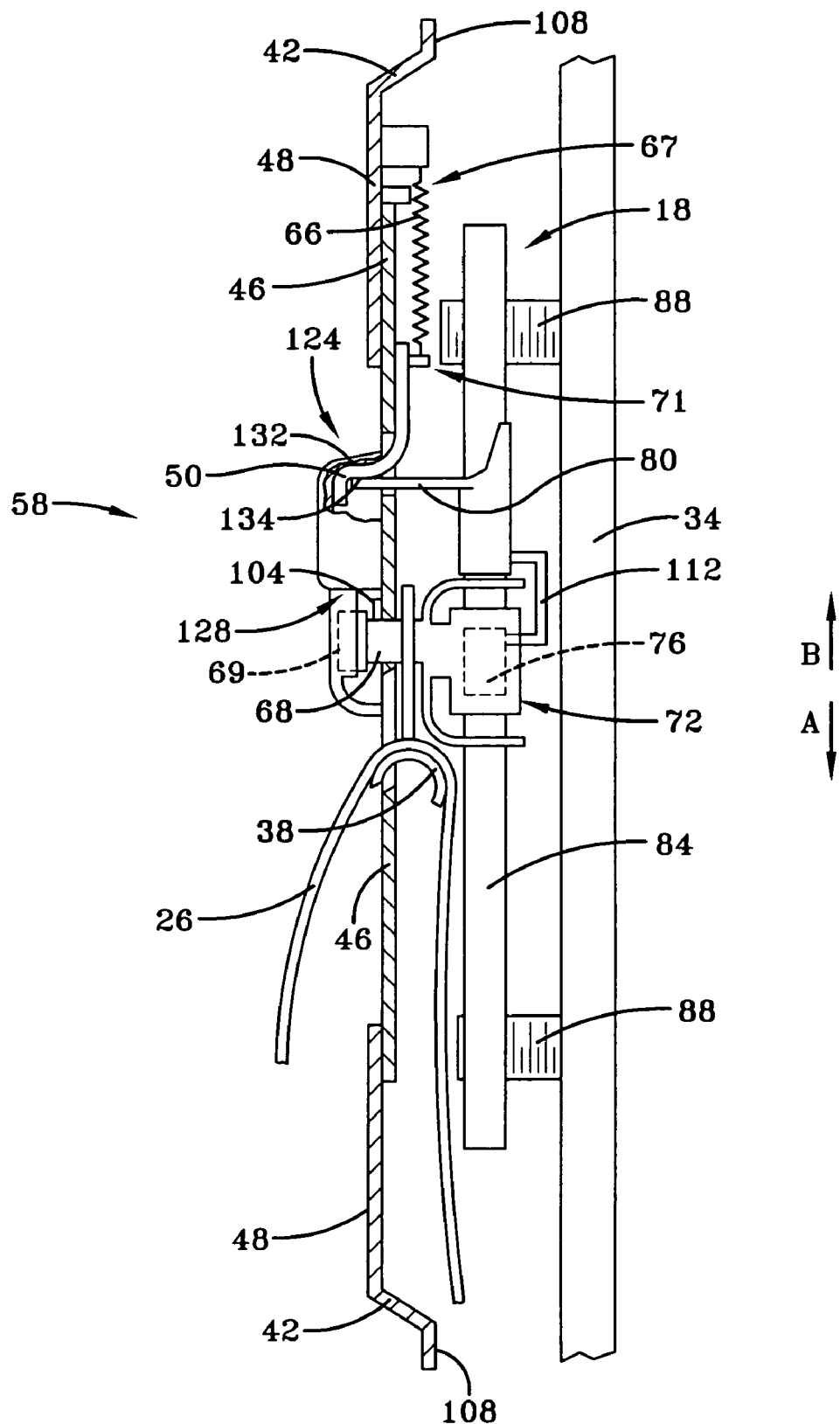
FIG. 4 illustrates the height adjuster of FIG. 2 from a side exposed view.

The operation of height adjuster assembly 18 will now be explained. Referring to FIG. 4, web guide 38 is mounted to bolt 68. Head 69 of bolt 68 is received within bolt recess 96, (see also FIG. 5) which is part of sliding cover 46. Bolt 68 is also mounted to carrier 72 of height adjuster assembly 18. Further, height adjuster assembly 18 has track 84, here a rail, which is mounted to B-pillar 34 by mounting bolts 88. Carrier 72 is slidably received on track 84 so that carrier 72 may move along with web guide 38 and sliding cover 46 in the direction of either arrow A or arrow B.

Holding carrier 72 in place is locking mechanism 76, here shown schematically, which locks carrier 72 to track 84 as known. One such carrier, rail and lock mechanism is shown in U.S. Pat. No. 6,733,041 B2 to Arnold, et al., which is incorporated herein by reference. Actuator 80 is linked by actuator link 112 to locking mechanism 76 and unlocks locking mechanism 72 to permit movement of carrier 72. Additionally, actuator 80 is in contact with release actuator cover 50 at button ledge 134 (see also FIG. 5). Thus, movement of release actuator cover 50 in the direction of arrow A causes movement of actuator 80 in the same direction to unlock locking mechanism 76 and to permit carrier 72 to move up or down. Locking mechanism 76 may have a spring (not shown, however, see the above patent) that biases actuator 80 in the direction of arrow B to return to its locked condition so that release of release actuator cover 50 will lock carrier 72 in place.

Because of a downward tensioning force from seat belt retractor 22 and from the weight of the shoulder belt portion 26, web guide 38 is subject to a downward force in the direction of arrow A. Accordingly, an individual wishing to move loop 38 upwardly in the direction of arrow B must overcome the combined load of the weight of shoulder belt portion 26 and the downward force from seat belt retractor 22. This load may make adjustment of height adjuster assembly 18 inconvenient. The prior art shows the use of assist springs acting directly upon the carrier of a height adjuster.

To facilitate the lifting of sliding cover 46 and web guide 38, a lift assist spring 66 is provided as shown in FIG. 4. Lift assist spring 66 is attached at one end portion 67 to fixed base 48. Another end portion 71 of lift assist spring 66 is attached to release actuator cover 50, which abuts ledge 132 of sliding cover 46.

Figure 6:
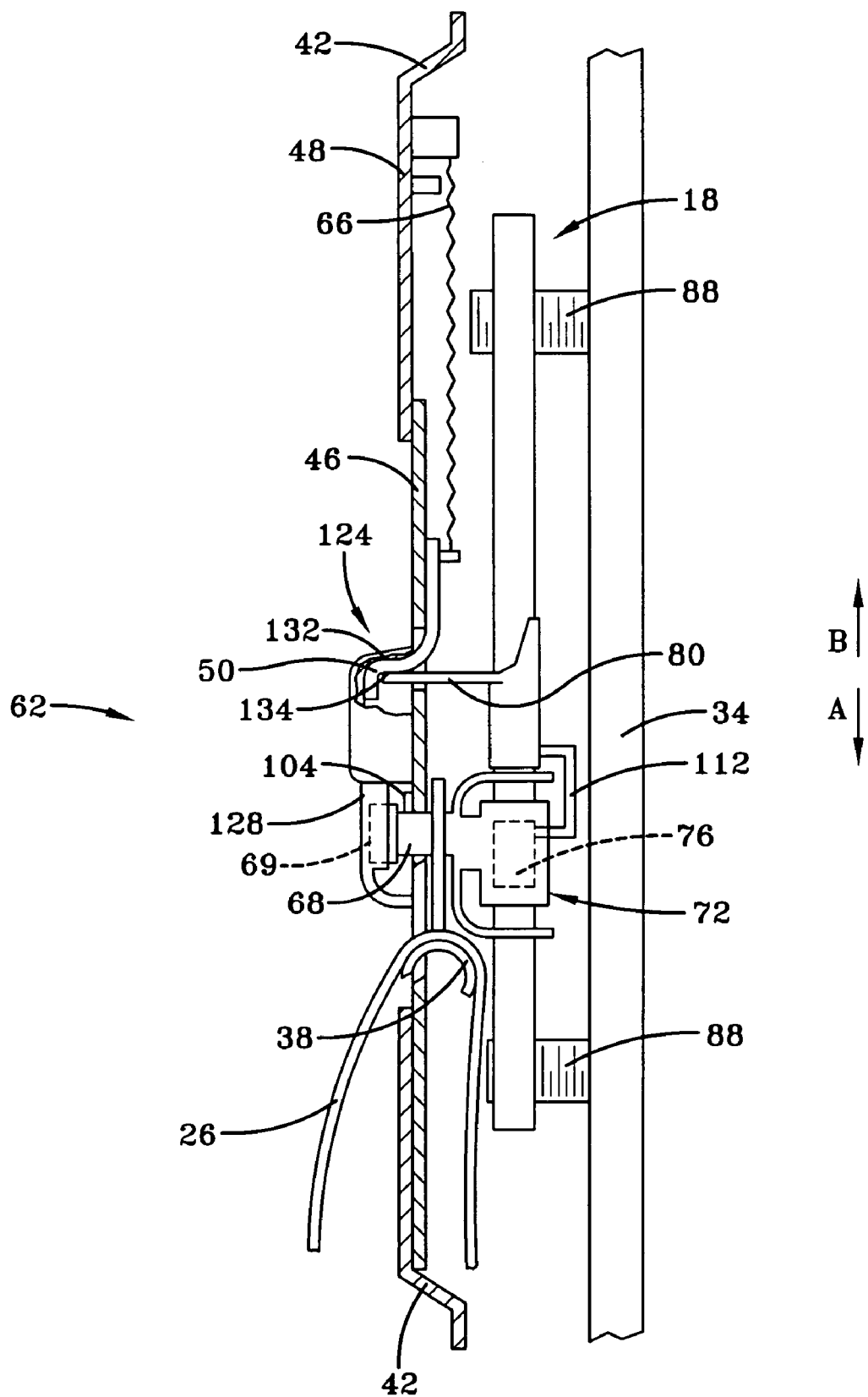
FIG. 6 illustrates the height adjuster of FIG. 3 after adjustment of the location of the web guide.

Hence, as shown in FIG. 6, following actuation of actuator 80, carrier 72 along with web guide 38 and sliding cover 46, may be dropped downward in the direction of arrow A to position 62 shown in FIG. 6. In this position, lift assist spring 66 is extended creating additional lifting force on release actuator cover 50, which is linked to sliding cover 46 and web guide 38 by ledge 132. Thus, when release actuator cover 50 is pressed in the direction of arrow A to release locking mechanism 76, lift assist spring 66 causes an upward force in the direction of arrow B on release actuator cover 50.

To couple this upward force to sliding cover 46 and web guide 38, one need only place a digit, such as a thumb, at thumb spot 128 while holding release actuator cover 50 down. Typically, when a passenger adjusts height adjuster assembly 18, he or she will place a digit, such as a finger, at finger spot 124 and a digit, such as a thumb, at thumb spot 128. The finger presses downward in the direction of arrow A to unlock locking mechanism 76 while the thumb at thumb spot 128 permits the lifting of sliding cover 46. The link between finger and thumb allows the upward force on the release actuator cover 50 to be transferred to the thumb and thus the sliding cover 50. In this way, a finger at finger spot 124 squeezes in the direction of arrow A to release locking mechanism 72 while a thumb at thumb spot 128 receives lift in the direction of arrow B from lift assist spring 66 to assist in the lifting of loop 38.

As further shown in FIG. 4, lift assist spring 66 also biases release actuator cover 50 in the direction of arrow B so that when release actuator cover 50 is pressed in the direction of arrow A, lift assist spring 66 will return release actuator cover 50 upwardly in the direction of arrow B. Thus, lift assist spring 66 works to return release actuator cover 50 to its unactuated position. In this way, a single spring performs both the function of assisting in the lifting of loop 38 and in the returning of release actuator cover 50 to its original position.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

The invention claimed is:

1. A height adjuster for a vehicle safety restraint comprising:
   a web guide (38);
   a track (84) for said web guide (38), said web guide (38) vertically movable along said track (84);
   a lock (76) having a locked condition for preventing vertical movement of said web guide (38) along said track (84) and an unlocked condition for allowing vertical movement of said web guide (38) along said track (84);
   a release mechanism (50, 80) operatively connectable to said lock (76), said release mechanism (50, 80) having a released position for placing said lock (76) in said unlocked condition and an unreleased position for maintaining said lock (76) in said locked condition; and
   a lift mechanism (66) for at least partially assisting vertical movement of said web guide (38) along said track (84) and for biasing said release mechanism (50, 80) toward said unreleased position, wherein said lift mechanism (66) comprises a spring (64) having a first end attached to a fixed base (48) and a second end of said spring (66) being operatively connectable to said web guide (38) and to said release mechanism and any downward movement of the release mechanism extends the spring to create additional lifting force.

2. The height adjuster of claim 1 wherein said spring (66) is manually connectable to said web guide (38).

3. The height adjuster of claim 2 wherein said spring (66) is attached to said release mechanism (50, 80), said web guide (38) manually connectable to said release mechanism (50, 80).

4. The height adjuster of claim 1 wherein said release mechanism (50, 80) includes a button (50) and an actuator (80), said button (50) for selectively moving said actuator (80) between said released position and said unreleased position and said actuator (80) for selectively locking and unlocking said lock (76).

5. The height adjuster of claim 1 including a seat belt (14) received by said web guide (38).

6. The height adjuster of claim 5 including a seat belt retractor (22) for retracting said seat belt (14).

7. The height adjuster of claim 1 including a carrier (72), said carrier (72) mounting said web guide (38) and received on said track (84).

8. A height adjuster for a vehicle safety restraint comprising:
   a web guide (38);
   a track (84) for said web guide (38), said web guide (38) vertically movable along said track (84);
   a lock (76) having a locked condition for preventing vertical movement of said web guide (38) along said track (84) and an unlocked condition for allowing vertical movement of said web guide (38) along said track (84);
   a release mechanism (50, 80) operatively connectable to said lock (76), said release mechanism (50, 80) having a released position for placing said lock (76) in said unlocked condition and an unreleased position for maintaining said lock (76) in said locked condition; and
   a spring (66) for upwardly urging movement of said web guide (38) along said track (84) and for upwardly biasing said release mechanism (50, 80) in said unreleased position, said spring (66) operatively connected to said web guide (38) and to said release mechanism (50, 80), said spring (66) biased by vertical movement of said web guide (38) and said release mechanism (50, 80), and wherein said spring (66) has a first end attached to a fixed base (48) and a second end of said spring (66) being operatively connectable to said web guide (38) and to said release mechanism and any downward movement of the release mechanism extends the spring to create additional lifting force.

9. The height adjuster of claim 8 wherein said spring (66) is manually connectable to said web guide (38).

10. The height adjuster of claim 9 wherein said spring (66) is connected to said release mechanism (50, 80), said web guide (38) manually connectable to said release mechanism (50, 80).

11. The height adjuster of claim 8 wherein said release mechanism (50, 80) includes a button (50) and an actuator (80) for locking and unlocking said lock (76), said button (50) for selectively moving said actuator (80) between said released position and said unreleased position and said actuator (80) for selectively locking and unlocking said lock (76).

12. The height adjuster of claim 8 including a seat belt (14) received by said web guide (38).

13. The height adjuster of claim 12 including a seat belt retractor (22) for retracting said seat belt (14).

14. The height adjuster of claim 8 including a carrier (72), said carrier (72) mounting said web guide (38) and received on said track (84).

15. A height adjuster for a vehicle safety restraint comprising:
   a web guide (38);
   a track (84) for said web guide (38), said web guide (38) vertically movable along said track (84);
   a carrier (72) mounting said web guide (38) to said track (84);
   a lock (76) having a locked condition for preventing vertical movement of said web guide (38) along said track (84) and an unlocked condition for allowing vertical movement of said web guide (38) along said track (84);
   a release mechanism (50, 80) operatively connectable to said lock (76), said release mechanism (50, 80) having a released position for placing said lock (76) in said unlocked condition and an unreleased position for maintaining said lock (76) in said locked condition, said release mechanism (50, 80) having a button (50) and an actuator (80), said button (50) for selectively moving said actuator (80) between said released position and said unreleased position and said actuator (80) for locking and unlocking said lock (76); and
   a spring (66) for upwardly urging movement of said web guide (38) along said track (84) and for upwardly biasing said release mechanism (50, 80) in said unreleased position, said spring (66) operatively connected to said web guide (38) and to said release mechanism (50, 80), said spring (66) biased by vertical movement of said web guide (38) and said release mechanism (50, 80), wherein said spring (66) has a first end attached to a fixed base (48) and a second end of said spring (66) being operatively connectable to said web guide (38) and to said release mechanism and any downward movement of the release mechanism extends the spring to create additional lifting force.

16. The height adjuster of claim 15 wherein said spring (66) is manually connectable to said web guide (38).

17. The height adjuster of claim 16 wherein said spring (66) is attached to said release mechanism (50, 80), said web guide (38) is manually connectable to said release mechanism (50, 80).

18. The height adjuster of claim 16 wherein said web guide (38) is slideably received on said track (84).

* * * * *